United States Patent
Singhal et al.

(12) 
(10) Patent No.: US 6,925,481 B2
(45) Date of Patent: Aug. 2, 2005

(54) TECHNIQUE FOR ENABLING REMOTE DATA ACCESS AND MANIPULATION FROM A PERVASIVE DEVICE

(75) Inventors: Sandeep Kishan Singhal, Englewood Cliffs, NJ (US); Barry Eliot Levinson, New York, NY (US); Darren Michael Sanders, Nanuet, NY (US)

(73) Assignee: Symantec Corp., Cupertino, CA (US)

( * ) Notice: Subject to any disclaimer, the term of this patent is extended or adjusted under 35 U.S.C. 154(b) by 827 days.

(21) Appl. No.: 09/848,394

(22) Filed: May 3, 2001

(65) Prior Publication Data

US 2002/0178211 A1 Nov. 28, 2002

(51) Int. Cl.[7] .............................................. G06F 13/00
(52) U.S. Cl. ...................... 709/200; 709/203; 709/217; 709/219
(58) Field of Search ................................ 709/200, 201, 709/203, 217, 218–220, 227

(56) References Cited

U.S. PATENT DOCUMENTS 6,765,596 B2 * 7/2004 Lection et al. .............. 715/835
6,816,719 B1 * 11/2004 Heinonen et al. ........... 455/403

* cited by examiner

Primary Examiner—Moustafa M. Meky
(74) Attorney, Agent, or Firm—Marcia L. Doubet

(57) ABSTRACT

Methods, systems, and computer program instructions for enabling users of pervasive devices to remotely access and manipulate information in ways that might otherwise be impossible or impractical because of inherent limitations of the device. The disclosed techniques enable a wide variety of data manipulation operations to be performed on behalf of the pervasive device, for a wide variety of content types. In preferred embodiments, no modifications or add-ons are required to the pervasive device.

57 Claims, 9 Drawing Sheets

FIG. 2A

|  | 200 | 201 | 202 |
|---|---|---|---|
| 205 | XML | convert to WBXML | DataManipulationServer/convert |
| 210 | XML | fax to recipient | DataManipulationServer/fax |
| 215 | ASCII | send as e-mail | DataManipulationServer/email |

FIG. 2B

|  | 250 | 251 | 252 | 253 | 254 |
|---|---|---|---|---|---|
| 255 | * | A | * | print | DataManipulationServer/print |
| 260 | .doc | B | Conference Room C | print | DataManipulationServer/print |

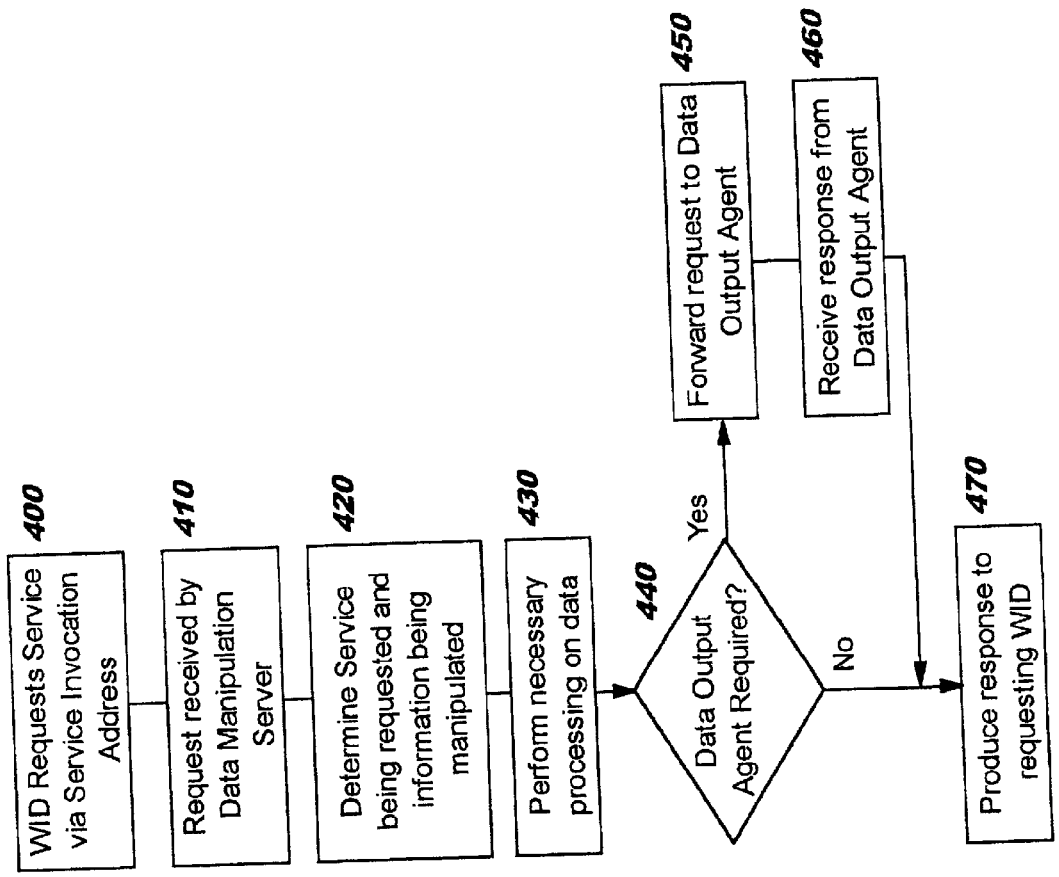

FIG. 5A http://DataManipulationServer/print

FIG. 5B

?url=http://www.reefedge.com

FIG. 5C http://DataManipulationServer/print?url=http://www.reefedge.com

FIG. 5D http://DataManipulationServer/print?file=//fileServer/report.doc

FIG. 5E http://DataManipulationServer/file?file=//fileServer/report.doc&dest=//newServer/filesAccessedByWID/report.doc

FIG. 5F

?cookie=acct_nbr:123456

FIG. 5G http://DataManipulationServer/email

FIG. 5H http://DataManipulationServer/email?msg=//mailServer/msg98765.txt&dest=lucy@ricardo.com

FIG. 5I http://DataManipulationServer/view?file=//fileServer/report.doc&template=segment

TECHNIQUE FOR ENABLING REMOTE DATA ACCESS AND MANIPULATION FROM A PERVASIVE DEVICE

FIELD OF THE INVENTION

The present invention relates to pervasive computing, and more particularly to methods, systems, and computer program instructions for enabling users of pervasive devices (such as limited-function mobile devices, smart appliances, etc.) to remotely access and manipulate information in ways that might otherwise be impossible or impractical because of inherent limitations of the device.

BACKGROUND OF THE INVENTION

Pervasive devices (also referred to as "pervasive computing devices") have become popular in recent years as people increasingly seek "anywhere, anytime" access to services such as voice and data communications. Many pervasive devices are designed to be mobile, and may equivalently be referred to as "mobile devices" or "mobile computing devices". Examples of mobile pervasive devices range from two-way pagers to personal digital assistants, or "PDAs" (such as the Palm Pilot, Handspring Visor™, or Compaq iPAQ) to cellular phones (such as the Nokia 6110) to multi-function devices (such as the Nokia 9110 or Qualcomm "pdQ™" smartphone). ("Visor" is a trademark of Handspring, and "pdQ" is a trademark of QUALCOMM Incorporated.) All pervasive devices are not necessarily mobile, however. Examples of this latter category include smart appliances for the home or business setting, devices which are permanently mounted in automobiles, and so forth.

Pervasive devices typically share several common characteristics:

1) limited processor speed;

2) limited memory capacity;

3) small size, which limits the richness of the data input and output interfaces (for example, small screen, limited keypad, and so forth);

4) a limited amount of software pre-installed on the device; and 5) access to limited-bandwidth networks.

The inherent drawbacks of these characteristics are further exacerbated by:

1) the need to maximize the device's relatively short battery life—which in turn prevents additional processor power or memory capacity from being added to the device; and 2) the need to simplify use of the device—which in turn reduces the desirability of supporting an "open" software installation platform in which arbitrary software packages might be added.

As people rely on pervasive devices for day-to-day information access tasks, they find that the experience can be extremely limiting. While pervasive devices vary widely in functionality and in their capabilities, some general observations for an average pervasive device can be made. First, the device typically does not have sufficient memory to store all of the information that the user requires. Indeed, most of a user's files or data are normally stored on a desktop personal computer ("PC"), laptop, or corporate server. Moreover, the device's memory limitations often prevent the user from manipulating large files, such as graphics-intensive presentations (where it might be desirable, for example, to re-order the slides within a presentation). Second, the device typically does not have the software required to access all of the data that the user might wish to use. For example, most pervasive devices are unable to run common software applications such as Microsoft® Word or Microsoft® Powerpoint. ("Microsoft" is a registered trademark of Microsoft Corporation.) Some pervasive devices, such as two-way pagers from Research In Motion ("RIM"), do not usually have a Web browser installed, and therefore the user cannot render data formatted as Web documents. Third, the device often does not have the necessary drivers installed with which to support all the data manipulation operations the user might wish to perform. For example, pervasive devices typically do not have drivers to support operations such as printing and faxing. Similarly, pervasive devices typically do not have drivers for video graphics array ("VGA") adapters that would enable the device to display content to a projector (such as a liquid crystal display, or "LCD," projector).

Some pervasive devices would not be considered as limited in function, although they may suffer from some of the drawbacks of limited-function devices such as poor ease-of-use (having, for example, a small screen size). Examples include the Compaq iPAQ Home Internet Appliance IA-1 and the Audrey™ home appliance from 3Com Corporation. ("Audrey" is a trademark of 3Com Corporation.) The term "Wireless Information Device", or "WID", will be used hereinafter to refer to this type of pervasive device as well as limited-function pervasive devices. (This term recognizes the fact that both the limited-function and full-function pervasive computing devices typically communicate using wireless communication techniques and protocols, such as 802.11, Bluetooth, and so forth.)

Various attempts have been made to address the limitations of WIDs; however, existing approaches fail to provide a satisfactory solution.

One existing approach to addressing the limitations of WIDs involves the technique of "transcoding" content into a form that is better suited for the WID. Products such as the WebSphere® Transcoding Publisher from International Business Machines ("IBM") Corporation and Spyglass Prism from Open TV, Inc. represent examples of this class of solution. ("WebSphere" is a registered trademark of IBM.) Through transcoding, the content is programmatically manipulated for a target device. For example, the transcoding process may enable the content to be rendered effectively on a small-screen device (perhaps by altering font size, removing image files, and so forth). Typically, a "transcoding engine" located on a server or network device receives the content in its original form, performs a conversion process, and delivers the renderable format to the client device. However, these transcoding solutions only address the need to view content: they do not provide a capability to manipulate the content from the WID. For example, the transcoding process does not enable the WID to e-mail, fax, print, or project the content.

Another approach to addressing the limitations of WIDs involves supplementing the capabilities of the WID through the deployment of hardware adapters or software. For example, a special-purpose attachment (known as a "Springboards™" module) may be plugged into a Handspring Visor device to enable the device to perform additional functions such as viewing and projecting Microsoft PowerPoint files. ("Springboard" is a trademark of Handspring.) The Presenter-to-Go™ module from Margi Systems, Inc. is one instance of such an attachment. ("Presenter-to-Go" is a trademark of Margi Systems, Inc.) As another example, software may be installed on a Microsoft Pocket PC device to enable the device to print Microsoft Word files to a limited set of printers. The PrintPocketCE software from FieldSoftware Products is one instance of such a software product. However, these client-centric add-on approaches increase the cost of the WID solution significantly and sometimes far exceed the cost of the WID itself. They also require additional power, effectively reducing the WID's available battery life. Each add-on solution typically supports only a single data manipulation option (or a very limited set of options), for only a limited set of file formats (or in some cases, for a single file format). Several different add-ons may therefore be needed to enable a WID to meet a particular user's requirements. An additional disadvantage of this approach is that the extra hardware is often bulky and inconvenient to carry, whereas additional software often requires a complex installation process by end-users, consumes valuable memory on the WID, and may not interoperate effectively with existing software loaded on the WID.

Therefore, what is needed is a technique for enabling WIDs to access and manipulate data that avoids the limitations of the prior art.

SUMMARY OF THE INVENTION

The present invention is directed to methods, systems, and computer program instructions for enabling wireless information devices to access and manipulate data. The data being accessed may reside on a Web server, a file server, a personal desktop PC, or elsewhere. The data may represent virtually any type of information, including Web content, e-mail messages, or files in various formats. The data manipulation operations that are provided through use of the present invention may include viewing, faxing, printing, and projecting the data, as well as delivering the data to a voice messaging system.

Note that the discussion herein is primarily in terms of a limited set of data manipulation tasks or operations. These operations are discussed for purposes of illustration, and not of limitation. Many other manipulation operations might be provided in an implementation of the present invention, including modifying or changing data in some way; converting data from one format to another; transferring data from one device to another (e.g. to a remote file server for storage); publishing the data to a Web site; importing data (including a file or document) into a repository; disseminating data to one or more recipients (such as by sending e-mail messages); attaching data to a workflow message; controlling a remote application (such as launching and paging through a remotely hosted PowerPoint presentation); and so forth.

Enabling WIDs to easily access a wide variety of types of data and to initiate a wide variety of manipulations on that data in an efficient, cost-effective manner—in spite of the device's inherent limitations (such as limited processor capacity, limited embedded software, and/or limited bandwidth capability)—is a primary objective of the present invention.

In preferred embodiments, the techniques of the present invention provide these advantages without requiring the installation of new software or hardware on the WID, in a manner that is easily extensible to support new manipulation operations and new data types.

Objectives of the present invention are realized by a solution that comprises one or more proxies, zero or more agents, and a data manipulation server (hereinafter, "DMS"). The DMS provides information about what services may be performed, and how to invoke those services. The DMS also performs operations on behalf of the WID, in cooperation with the proxies and the agents. In preferred embodiments, the proxies, agents, and DMS are not located within the WID, but instead are accessed by sending one or more request messages from the WID. This solution enables the WID's capabilities to be augmented in a very flexible yet powerful and cost-effective manner, without requiring any modifications to be made to the WID itself.

BRIEF DESCRIPTION OF THE DRAWINGS

FIGS. 2A and 2B illustrate examples of a table in which information about available data access and/or manipulation services is stored, according to a preferred embodiment of the present invention;

FIG. 4 provides a flowchart that depicts logic with which a WID requests a manipulation service upon data it has accessed, and with which that service is performed, according to a preferred embodiment of the present invention;

FIGS. 5A–5I provide syntax examples that are used in describing operation of a preferred embodiment of the present invention.

DETAILED DESCRIPTION OF PREFERRED EMBODIMENT

The present invention will now be described more fully hereinafter with reference to the accompanying drawings, in which a preferred embodiment of the invention is shown. Like numbers refer to like elements throughout.

Flowchart illustrations of aspects of the present invention are described below. The logic of these flowcharts may be provided as methods, systems, and/or computer program instructions embodied on one or more computer readable media, according to an embodiment of the invention. As will be obvious to one of ordinary skill in the art, these flowcharts are merely illustrative of the manner in which the associated aspects of the present invention may be implemented, and changes may be made to the logic that is illustrated therein (for example, by altering the order of operations shown in some cases, by combining operations, etc.) without deviating from the inventive concepts disclosed herein.

The present invention provides an efficient, cost-effective technique for enabling a wireless interface device to easily access a wide variety of types of data and to initiate a wide variety of manipulations on that data, without requiring the installation of new software or hardware on the WID, and in a manner that is easily extensible to support new manipulation operations and new data types.

Figure 1:
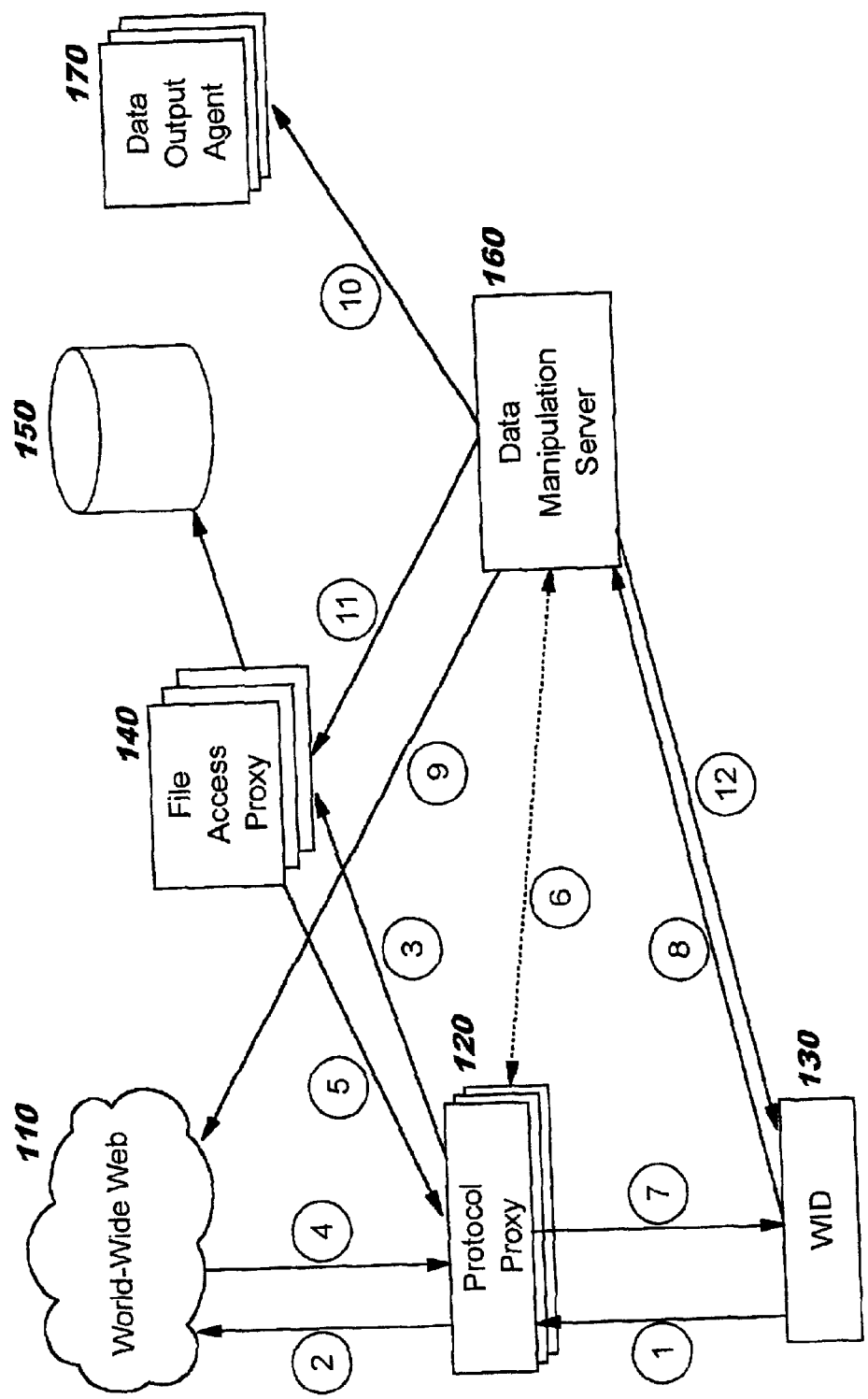
FIG. 1 provides a block diagram which depicts an architecture and components of a preferred embodiment of the present invention.

FIG. 1 illustrates a preferred architecture and components of a system in which the present invention operates. The system may provide support for multiple WIDs, although only one WID 130 is illustrated in FIG. 1. The WID, which in preferred embodiments is a commercially-available WID which may be provided by any one of a number of vendors, includes at least one software application with which a user interacts to access and/or manipulate data. In preferred embodiments, this user-interaction software application is the only software required on the WID to enable use of the present invention. This user-interaction software preferably comprises a browser implementation (such as a Web browser); in alternative embodiments, other types of user-interaction software applications (including, but not limited to, e-mail client software) may be used. The user-interaction software application may be installed on the WID when it is marketed, and may be a commercially-available software implementation. When browser software is present, it preferably supports at least one markup language. Examples of markup languages that may be supported include the Hypertext Markup Language ("HTML"); Wireless Markup Language ("WML"); and Voice Extensible Markup Language ("VoiceXML").

Note that while preferred embodiments of the present invention operate with commercially-available WIDs and without requiring hardware or software modifications or add-ons, in alternative embodiments the WID may be specifically adapted for use with the present invention, without deviating from the inventive concepts disclosed herein. For example, a WID might include modifications to provide a user interface tailored for use with the present invention, or perhaps code for optimizing data access and/or manipulation processing. Moreover, auxiliary software may be provided to provide enhanced authentication, encryption, compression, or similar functions that augment the transmission of data described herein. Furthermore, while the preferred embodiment anticipates invocation by user interaction (and user-interaction software), there may be implementations in which automated or programmatic invocation is appropriate. In these cases, software which embodies the automated or programmatic invocation may replace the previously-described user-interaction software as the only software required on the WID to enable use of the present invention. Or, the two forms of invocation software may co-exist on a WID.

At least one protocol proxy 120 is provided, according to the teachings of the present invention. A protocol proxy provides a bridge between the client (i.e. an application executing on WID 130) and the information that it seeks to access and manipulate. A protocol proxy is responsible for accessing information on behalf of the client and (in preferred embodiments) annotating this accessed information with information about the manipulation services available for that accessed information. (The annotation process is described in more detail below, with reference to Block 350 of FIG. 3.) The information may be accessed, for example, from its location on one or more Web content servers in the World Wide Web (hereinafter, "Web") 110, in a distributed file system 150 of the prior art, or from an application of the prior art. This content server may deliver content that includes services which have been "pre-added" to the content (e.g. by querying the DMS directly), so that the protocol proxy is not required to provide additional annotations. This latter situation may be particularly beneficial, for example, if the content server happens to be co-located with the DMS.

Preferred embodiments of the present invention include at least one of the following types of protocol proxy: (1) a Hypertext Transfer Protocol ("HTTP") proxy, (2) a Wireless Session Protocol ("WSP") proxy, and (3) a Simple Mail Transfer Protocol ("SMTP"), Post Office Protocol ("POP" or "POP3"), or Internal Message Access Protocol ("IMAP") proxy. An HTTP proxy handles requests for and reception of information using HTTP request and response messages. A WSP proxy handles requests for and reception of information using WSP request and response messages. SMTP, POP, and IMAP proxies handle requests for and reception of electronic mail respectively using SMTP, POP, and IMAP request and response messages.

Alternative embodiments may include different and/or additional protocol proxy types. For example, a synchronization protocol proxy may be included, which may be used to synchronize data stored locally on a user's WID with data stored elsewhere (such as on the user's desktop PC). An example synchronization protocol is "SyncML" which is being developed by The SyncML Initiative to seamlessly synchronize wireless and wireline data and devices. (See http://www.syncml.org for more information on SyncML.)

The protocol proxies in a particular implementation of the present invention may each run on different hosts if desired, and individual protocol proxies may be co-located with other components of the system. The protocol proxy function described herein may be replicated, if desired (for example, to administratively separate different types of proxy function, for purposes of fault tolerance or fault isolation, for scalability and load balancing, etc.) Moreover, a single proxy may itself be divided into separate components. For example, an HTTP proxy may include a first component that determines whether the request is for content on the Web or perhaps on a file server; a second component that handles those requests which are for Web content; and a third component that handles those requests which are for content from a file server. The multiple components may, in turn, be distributed across multiple machines.

In one embodiment, prior art configuration mechanisms are used to adapt the WID for communicating with a protocol proxy. For example, the client Web browser may be instructed to communicate with an HTTP proxy, or synchronization software on the WID may be configured to send synchronization protocol messages to the synchronization protocol proxy. In this embodiment, the protocol proxy then intercepts outbound messages from the client on the WID and processes those messages as disclosed herein. In another embodiment, a WID communicates with a protocol proxy through a wireless access point (not shown in FIG. 1), such as an 802.11 access point or a Bluetooth access point (the functioning of which is known in the art). In this latter embodiment, the access point or an adapter device communicating with the access point receives outbound messages from the WID and evaluates those messages to determine which protocol is in use. The access point or adapter device then routes the outbound message to the appropriate protocol proxy. (This latter embodiment is preferred in the present invention because it avoids the need to configure the WID.)

Zero or more file access proxies 140 are also provided, according to the present invention. File access proxies may be located on various file servers, desktop computers, database systems, or other storage devices, and provide access to data stored in one or more repositories 150 which are located on (or otherwise accessible to) those machines. A particular file access proxy may access data from a local repository, within remote data stores (such as information that is accessible from a remote file server or Web server), information stored within local applications (such as stored e-mail messages), and/or information stored within remote applications (such as information that is accessible through a database or directory application). Accessible information may be dynamically generated by the local or remote application, such as a live sensor reading.

A data manipulation server 160 is provided, according to the present invention. In preferred embodiments, the DMS has two roles. One role is to provide data manipulation services. Another role is to maintain a repository of the available services for various types of data and to make this information available.

While not shown in FIG. 1, it may be desirable in some situations to have multiple data manipulation servers 160, for example for purposes of availability or load balancing or administrative control. Furthermore, the DMS may be located within a cluster. The function of the DMS may optionally be partitioned, with different services hosted on different DMS's.

In its role of providing data manipulation services, those services may be provided by the DMS either directly, or indirectly by invoking one or more data output agents 170 (which are described below). For example, the DMS may directly manipulate content by performing a conversion of the content into HTML upon receiving a conversion request from the WID. As another example, the DMS may indirectly manipulate content by forwarding the content to a file manipulation agent, where that file manipulation agent is responsible for storing the content in a repository. In simple cases, the DMS may operate in a "pass-through" mode wherein it merely forwards content to a data output agent (such as a file manipulation agent). In most cases, however, the DMS performs operation-specific processing of the data received from the client before determining whether and where to forward data that may need further processing by an agent. In general, the data manipulation operations provided by the DMS may be arbitrarily complex, and operate in a content-dependent manner. In some cases, manipulation requests received from the WID may imply other manipulations that need to be performed. As one example, if a request is received from the WID to fax content to a recipient, the DMS preferably invokes a conversion process (which may be provided by the DMS, by a data output agent, or perhaps by another component of the system) to transform the content into Tag Image File Format ("TIFF"), where the resulting TIFF document is then sent to a data output agent responsible for performing facsimile transmission. As another example, if a request for printing a Web page is received from the WID, the DMS first accesses the content of the Web page by retrieving it from the Web (or perhaps from cache storage) and then forwards that content to a selected data output agent which is responsible for print services. More information on the data manipulation processing provided by the DMS is provided below, with reference to FIG. 4.

In its role as a repository of available services, the DMS preferably maintains a table (or a list or other analogous structure, referred to hereinafter as a "table" for ease of reference) to identify those services. At run-time, this table is used to provide the WID with a list of the available data manipulation services for particular data content. The table is preferably organized according to file content type. An example is shown in FIG. 2A, which indicates that files of type "XML" may be converted to WBXML ("Wireless Application Protocol Binary XML") decks (see 205) or faxed to recipients (see 210), whereas files of type "ASCII" may be sent as e-mail (see 215). In this example, the file content type appears first, in column 200; an identification of the service appears next, in column 201; and an address of the service (i.e. a service invocation address, described below) appears in column 202. The service identification from column 201 may, for example, be presented to a user on a user interface to enable user selection of the corresponding service.

Alternatively, the table may be organized in a different manner. Furthermore, the entries in the table may optionally provide for further qualifying the services, such that the availability of a particular service depends on additional factors beyond the file content type. Examples of such factors include: (1) identification of individual users or user groups; (2) user privileges or access rights; (3) particular locations from which a service will be available; (4) the target WID type; and (5) combinations of such factors. FIG. 2B provides an example of this optional further qualification, wherein the example table is organized according to file content type (in column 250), user identification (in column 251), and location (in column 252). The service is identified in column 253, and the service invocation address appears in column 254. As illustrated therein, the print service is available with all files and all locations (indicated by presence of a wildcard symbol "*") for user A (see 255), whereas printing is only available to user B for files of type ".doc" and only while he is located in Conference Room C (see 260).

When user identifying information is stored in the DMS' table for use as a factor in service availability, it may be represented in several alternative formats, such as: the user's name; a department number to which an authorized user must belong; an Internet Protocol ("IP") address (which may optionally identify a user group, e.g. through a subnet mask) of the user's WID; and so forth. Similarly, location information used as a factor in service availability may be represented in several alternative manners. Location information is further described below, with reference to Block 340 of FIG. 3. Some factors used in determining service availability, such as user access rights or privileges, may require dynamically querying a directory or similar repository at run-time to determine availability. Information used in the retrieval may in some cases be obtained from the request message issued by the client (e.g. from header values in HTTP requests). Techniques for performing this type of dynamic look-up processing are well known in the art, and will not be described in detail herein.

The examples in FIGS. 2A and 2B use a simplified format for purposes of illustration. In an actual implementation, the entries in the tables may vary from the format shown. For example, the identification of the available service may perhaps be represented using numeric identifiers, rather than textual descriptions. In this case, the WID may optionally contain software adapted for use with the numeric codes, and may translate the codes into text before displaying a list of available services to the user. Or, this translation might be performed by the protocol proxy before the available services list is returned to the WID. The table might also contain an identification of an icon or graphic symbol corresponding to selected ones of the available services, where this icon or symbol can be displayed to the user on the WID. The table might also contain multiple versions of the textual or graphical descriptions, to accommodate presentation in different languages.

A "service invocation address" is specified for each service (see the examples in columns 202 and 254 of FIGS. 2A and 2B, respectively) and indicates an address at which the service may be invoked. In preferred embodiments, these addresses are provided as Uniform Resource Locators ("URLs"). Preferably, the addresses are specified within the entries stored in the DMS's table, as shown in the example tables of FIG. 2A and FIG. 2B, although alternatively the addresses may be separately stored (perhaps as a storage optimization). As an example of using the latter approach, a print service might appear many times in the DMS' table. To eliminate redundant storage of this service's URL, the URL might be correlated to the print service but separately stored, enabling individual table entries such as 255 and 260 in FIG. 2B (which specify qualifiers on when printing is available) to be associated with the proper URL at run-time even though column 254 is omitted. Similarly, separate storage may be desirable in cases where the appropriate URL to use for creating the available services list is determined dynamically at run-time.

Note that while the service invocation addresses used herein as examples specify locations on a DMS, this is for purposes of illustration and not of limitation. One or more of the URLs may alternatively identify services provided at locations other than the DMS.

In alternative embodiments, service invocation addresses may employ address formats other than URLs, such as e-mail addresses, or perhaps a combination of an e-mail address and subject line, to designate a service to be invoked.

When requested information is delivered to a client application on the WID, a list of service invocation addresses for the available services is provided along with that information (as will be discussed in more detail with reference to Block 350 of FIG. 3). Each service invocation address is preferably augmented with an identity of the information that is to be operated upon. In some cases, it may be possible to infer the information identity from the service invocation address, in which case this augmentation is not required. For example, a service invocation address might identify a Structured Query Language ("SQL") query whose result is implicitly the data being manipulated.

Returning now to FIG. 1, one or more data output agents 170, which implement specific output manipulation operations (such as printing, faxing, projecting, or delivering to a voice mail system, the details of which do not form part of the present invention), are provided. (Note that a data output agent, as the term is used herein, refers to a component that delivers file content to an output device, whereas a file access proxy as defined herein retrieves file content in read-only mode. In some instances, a data output agent and a file access proxy may be co-located, and furthermore these functions may be implemented within a single software component.) The DMS passes data to selected ones of these agents to perform the manipulation services which are managed by the DMS. In preferred embodiments of the present invention, one or more of the following data output agents are supported:

- a print server agent, which is responsible for sending jobs to one or more printers;
- a projection server agent, which is responsible for driving the display of content to an LCD projector, video display, or other graphical terminal;
- a file manipulation server agent, which is capable of performing file operations such as copying, deleting, and renaming files (and which is typically co-located with a file access proxy);
- an e-mail manipulation server agent, which is capable of performing e-mail operations such as sending, receiving, and deleting e-mail messages (and which is typically co-located with a file access proxy that accesses e-mail files);
- a fax server agent, which is responsible for sending information for facsimile transmission; and
- a voice mail server agent, which is responsible for sending information for delivery through a voice messaging system.

The agents may send data to queues or other similar structures or processors, which may in turn be implemented as agents. For example, the output of a print server agent may be sent to a selected print queue for printing (using queuing techniques which are well known in the art). An agent such as a print server may manage local resources, such as a locally-stored print queue for a particular printer, or remote resources, such as access to multiple printers (each of which typically has its own print queue processing). In degenerate cases, a print server agent may be manifested simply as a print queue. Similarly, other agents such as the fax server agent and projection server agent may be manifested as queues for their respective devices.

Figure 3:
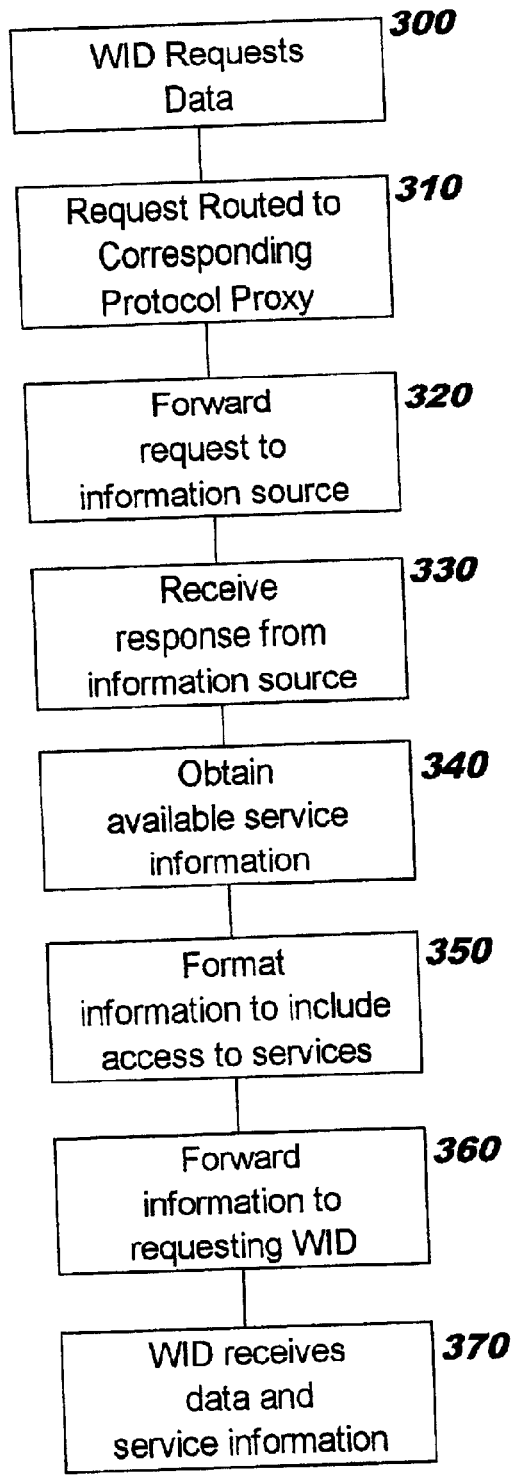
FIG. 3 provides a flowchart that depicts logic with which a WID accesses data and receives information about what manipulation operations are available on that data, according to a preferred embodiment of the present invention.

Referring now to FIG. 3, logic is illustrated that may be used to provide data access support for a WID, including delivery of a list of the manipulation operations that are available on that data. At Block 300, the client software on the WID issues a request for information. (This corresponds to request message flow 1 in FIG. 1. The encircled numbers in FIG. 1 all refer to message flows.) Typically, this request is initiated by action of the WID user. Block 310 indicates that a protocol proxy receives this request. As described earlier, the outbound request either may be received by the protocol proxy to which the client software has been configured to communicate, or may be received by a wireless access point or adapter device (which then inspects the content to determine which protocol proxy is required, and forwards the request to that proxy).

At Block 320, the protocol proxy forwards the request to the appropriate information source. For example, if the request is an HTTP request for Web content issued by a Web browser, then an HTTP proxy forwards that HTTP request to the Web. Or, if the request is for file content, it will be forwarded to a file access proxy. (This corresponds to message flow 2 or 3 in FIG. 1.) At Block 330, the protocol proxy receives the response from the information source. (This corresponds to message flow 4 or 5 in FIG. 1.)

The protocol proxy then determines, in Block 340, which services are available to the WID for manipulating the returned content. This determination may be made in several ways. In a preferred embodiment, the protocol proxy issues a query to the DMS for a list of available services. (This corresponds to message flow 6 in FIG. 1.) Upon receiving the list from the DMS, the protocol proxy may optionally cache the list for use with subsequent requests (in order to avoid the message exchange and processing overhead of repeatedly requesting such information from the DMS). In an alternative embodiment, the protocol proxy may be statically pre-configured with a list of available services that are appropriate for particular types of content, users, locations, or other criteria as described previously with respect to FIGS. 2A and 2B; in this case, message flow 6 of FIG. 1 is not required.

When queried by the protocol proxy at Block 340, the DMS consults its stored table entries (see FIGS. 2A and 2B for examples), using logic that is adapted to the particular storage format in use by that DMS, and determines which services are available for the data being returned to the WID. As stated earlier, the available services are preferably filtered according to the type of content being returned, and may also (or alternatively) account for one or more other factors. (This filtering process has been discussed with reference to FIGS. 2A and 2B, above.)

When an identification of the user is one of the factors used to determine service availability, the user's identification may be obtained in a protocol-specific manner. For example, the user's identification may be available as the value of a cookie in an HTTP request or response header. Or, in some cases a look-up operation may be performed to obtain this information if a table or other similar repository of such information is available.

In preferred embodiments, the client software on the WID does not participate in data manipulation operations (rather, the request is sent to the DMS, which obtains the data and manages the manipulation operations), and therefore capabilities of the WID may not be of interest when determining the list of available services. However, there may be some cases where this information is deemed useful. For example, it may be known that user input is required for a particular manipulation operation (such as specifying the target of an e-mail message). If the target WID is incapable of supporting the necessary interactions, then that service is preferably omitted from the delivered list by the evaluation performed by the DMS at Block 340. When this type of processing is to be performed, information about the capabilities available on the WID may be obtained in a variety of ways, such as by inspecting the content types accepted according to the Accept header of an HTTP message, by assessing browser capabilities according to information provided in the User-Agent header of an HTTP message, by analyzing capability information explicitly provided by the device, or by inspecting a repository of capability information indexed by device identity. These approaches for determining client capabilities are well known in the prior art.

When information about the location of the WID is used as a factor in determining available services, this location information may also be obtained in various ways and once obtained, may be used in various ways. The location information may, for example, be determined by querying a global positioning system ("GPS") function on the client. Or, the location information might be obtained by querying a Location Registry, such as the Location Registry described in commonly-assigned (U.S. patent application Ser. No. 09/848,441, filed concurrently herewith), which is entitled "Location-Aware Service Proxies in a Short-Range Wireless Environment" and which is incorporated herein by reference. As disclosed therein, a mobile device's access point (equivalently, a WID's access point) monitors its traffic to obtain the device's location. This location information, which preferably comprises a list of access points which are near the mobile device at a point in time, is maintained in the Location Registry. This Location Registry implements a query interface that may be used by an implementation of the present invention to determine the location of a particular WID. This related invention also discloses "Location Aware Service Proxies" that intercept requests initiated by mobile clients, and that use the location of the mobile device to determine which content to deliver to the mobile device. These location-aware service proxies may be used in conjunction with the present invention to determine what content may be delivered, and a protocol proxy may then annotate that content with available services information (where the set of available services may also be based on location, among other factors). Furthermore, a protocol proxy as disclosed herein may also function as a location-aware service proxy. In this latter case, the location-aware service proxy preferably performs further location-sensitive filtering on the available services list obtained from the DMS in Block 340. Or, alternatively, the location-aware service proxy may transmit location information to the DMS (e.g. on message flow 6 of FIG. 1), where the DMS then factors that information into its list-generation processing.

Once the protocol proxy has the list of available services, it preferably formats or annotates that list in Block 350. (In alternative embodiments, this function may be performed by the DMS before it returns the available services information to the protocol proxy.) In a preferred embodiment, this annotation comprises modifying the service invocation addresses to enable the WID's user to easily invoke each available service. For example, in the case of HTML content such as a Web page, the protocol proxy in this preferred embodiment adds a set of links (which may be represented as text or icons) to the list of available services that may be used to manipulate that HTML content. Preferably, the links take the form of a service invocation address that is parameterized with an identity of the information to be manipulated. Suppose, for example, that one of the available services is to print a Web page, and that the DMS has supplied the service invocation address shown in FIG. 5A for that print operation, where this syntax, in this example, identifies print service software on the DMS itself. Using the standard HTTP syntax for a parameter list, the Web page "www.reefedge.com" may be identified for printing by this print software by supplying the parameter list shown in FIG. 5B, which identifies the data being manipulated, thereby yielding an annotated link as shown in FIG. 5C.

As another example, suppose a Microsoft Word document named "report.doc", which is accessed from the root directory of a file server named "fileServer", is being returned to the WID, and that available services for this document include printing it and filing (i.e. storing) it on a file server. To print the document, the document may be identified for printing by the print software on the DMS by supplying the sample syntax shown in FIG. 5D, where the parameter "file=//fileServer/report.doc" identifies the data being manipulated.

Alternatively, to identify the document for filing at a location "newServer/filesAccessedByWID/", the sample syntax shown in FIG. 5E may be used, where the value of the "dest" parameter identifies the new file storage location.

In the preferred embodiment, the service invocation address may be coupled with additional information during this annotation process in order to ensure that the DMS (and/or data output agent, as appropriate for a particular manipulation service) accesses and manipulates the required information. For purposes of illustration, suppose the user accessed a Web page for which cookie values were used in customizing the page content. As an example, the WID user's bank account number may have been transmitted in a cookie on the outbound HTTP request message, and this account number may have been used by a Web server to generate a Web page showing the user's current bank account balances. If, after viewing this customized Web page, the user decides that she would like to print the information, the DMS must be able to use this same page content when invoking the printing operation. Rather than forwarding the Web page from the WID to the DMS, the protocol proxy of the preferred embodiment captures the cookies that were present on the original HTTP request and includes those cookies as additional parameters on the annotated links created during the processing of Block 350. (Preferably, all cookies are stored and copied to the links, although if the protocol proxy is adapted to know that certain cookies are irrelevant, they may be omitted.) By preserving the cookies in the link annotations, the subsequent manipulation services invoked from the DMS will automatically have the same cookie values that were used in processing the original request message, thereby ensuring that the manipulated content corresponds to the content delivered to the WID user. FIG. 5F provides an example of syntax that may be used to annotate a link with a cookie whose name is "acct_nbr" and whose value is "123456". (Note that the DMS prepares the user's bank account information for printing in response to a data manipulation request indicated as message flow 8 in FIG. 1, and invokes the print process at a data output agent by issuing message flow 10 in FIG. 1. The processing performed by the DMS may further comprise obtaining bank account information by issuing message flow 9 in FIG. 1.)

This same approach may be used for form parameters that are submitted to a Web server (e.g. using an HTTP POST message). To encode the form parameter information in the URL, a parameter name such as "postParams" may be substituted for the "cookie" parameter name shown in FIG. 5F. A parameter name/value pair may then be listed, in an analogous manner to listing a cookie name/value pair.

A service invocation address may be coupled with any combination of cookies, form parameters, or other information.

When encoding cookies, form parameters, and other information in this manner, three issues should be considered. First, URL length is currently limited to 255 characters, according to the HTTP specification. Second, it is difficult to encode all character sets in URLs. Third, a DMS may in some cases be implemented within a Web client which is not able to programmatically control the sending of request data. For example, the DMS might use Microsoft Internet Explorer, which provides no programmatic way to force a cookie to be sent. To address these problems, the cookies, form parameters, and so forth may be cached by the protocol proxy (i.e. when the original content is being processed). This cached information may then be used in three ways to construct a valid request for use with the present invention.

In a first approach, in the service invocation address URL, a parameter can be given by which the cached parameters can be obtained by the DMS from the protocol proxy. For example, "?params=http://protocolproxy/params/139x3e245" gives the DMS a URL from which the cached parameters, cookies, etc. can be obtained. The value "139x3e245" in this example is meant as a temporary code which represents the parameters associated with the particular request.

In a variation of this first approach, the parameter on the service invocation address URL may identify how to obtain the cached parameters from the cache, rather than from the protocol proxy.

In a second approach, the data URL may actually point to the protocol proxy itself. The protocol proxy, upon receiving the data request from the DMS, determines the real request and obtains the requested data on the DMS' behalf. For example, "http://protocolproxy/request/139x3e245" might cause a request (along with the appropriate cookies, form parameters, and other information) to be issued from the protocol proxy to the true source of the data.

In a third approach, the DMS may request the content by itself using the protocol proxy, in much the same way that all requests from the WID were directed through the protocol proxy. However, the protocol proxy may annotate the data source with a tag that the protocol proxy can later use to reconstruct the original query. For example, the protocol proxy might rewrite the content request URL to be "http://www.yahoo.com/?protocolproxy=139x3e245", so, upon receiving the request from the DMS, the protocol proxy may look up session 139x3e245 in its cache, obtain the necessary parameters, and forward the properly-formatted request to location "www.yahoo.com".

It is also possible that the protocol proxy might cache the data content (rather than the parameters). In this case, the content location provided by the protocol proxy might then point to that cache. There is then no need to provide cookies or parameters in the URL, because the DMS can obtain the full content from the cache. To achieve maximal performance and capacity in this situation, the cache is preferably capable of storing multiple versions of content associated with the same URL, with each version associated with a different combination of cookies, form parameters, and other request information.

Optionally, additional formatting information may be supplied as parameters on selected service invocation addresses during the annotation process of Block 350. These additional parameters may be provided for implementation-specific usage, including for customization of the data manipulation service. One example, described above, is to specify a destination address for a file that is being stored in a repository. As another example, suppose the data manipulation service is to send an e-mail message to a particular recipient. An example of invoking the "email" service, which is managed through the DMS at the location shown in FIG. 5G, to send a message identified as "msg98765.txt" to the recipient "lucy@ricardo.com" is shown in FIG. 5H.

As yet another example of adding parameters to service invocation addresses, it may be desirable in a file conversion service to supply parameter values to be used in guiding the conversion process. Suppose, for example, that the previously-discussed "report.doc" Microsoft Word document is being converted to HTML, and that the conversion software allows several different types of transformations, based upon identification of a particular template. The template may specify how to format the title, for example, and how to "chunk" the source document into different pieces, how links to those pieces are embedded, and so forth. If the template parameter value is "plain", for example, the conversion is adapted to returning plain text, whereas if the template parameter value is "segmented", then the conversion may generate a "chunked" document where each logical input segment appears on a different page, and perhaps failing to specify a template parameter value causes the entire document to be generated as a single HTML page. A sample service invocation address for viewing the converted file in segmented form is shown in FIG. 5I.

Preferably, the annotation process of Block 350 generates separate annotated links for each valid option, such that when the user selects one of the links, all the necessary information is present for properly invoking the data manipulation service. (Note that the DMS prepares this file for viewing in response to a data manipulation request indicated as message flow 8 in FIG. 1, and returns the result for rendering on the WID at message flow 12 in FIG. 1. The processing performed by the DMS may further comprise obtaining the file content by issuing message flow 11 in FIG. 1.)

The parameter types supplied during the annotation process may be stored in, and obtained from, the DMS table along with the applicable service invocation address. Or, the protocol proxy may provide service-specific code for determining which parameter types are applicable for a particular service.

While the preferred embodiment has been described in terms of embedding the service description directly into the content (e.g. as links in HTML), other alternative approaches may be used without deviating from the scope of the present invention. As one example, the annotation process may comprise generating a compound document which combines the original content (in HTML, WML, XML, etc.) and the service definition (in XML, or perhaps a similar well-structured markup language). In this approach, the service description may be embedded directly into the content. As another example, a multi-part MIME (Multi-purpose Internet Mail Extensions) message may be generated which contains the original content (in one part) and the service description (in another part). These alternative approaches provide different ways for conveying the list of available services.

Optionally, an implementation of the present invention may enable the protocol proxy itself to directly invoke data manipulation operations. For example, during the annotation processing in Block 350, the protocol proxy may wish to save the content being returned to the WID in response to its request message into a cache, for faster retrieval on subsequent requests. Or, the protocol proxy may determine that a data conversion operation is desirable, for example by converting an XML document to a WBXML deck. Preferably, the protocol proxy sends a data manipulation request message to the DMS for such processing, and the DMS then invokes the necessary file access proxy and/or other data output agent processing. Upon receiving the response from the DMS, the protocol proxy preferably delivers the resulting data to the WID in addition to (or, alternatively, instead of) the originally accessed information. For example, if the original request was for a Web page, and the protocol proxy requests that this Web page be converted to a WBXML deck, then either the deck or the deck plus the Web page may be delivered to the WID, as appropriate in a particular implementation of the present invention. (As will be obvious, some types of DMS response are preferably never transmitted to the client, such as those responses or portions thereof which provide return code and status information.) This type of protocol proxy-initiated manipulation may be appropriate when software executing on the proxy can predict that the user would be likely to request the data manipulation operation, and the "automatic" invocation by the protocol proxy therefore serves to simplify the user's task. It is also appropriate when the protocol proxy can determine that the data in the accessed format cannot be presented on the WID without first performing a conversion. This latter type of determination may be made by inspecting the content types accepted by the WID, for example as indicated on the Accept header of the outbound HTTP request. In the preferred embodiment, the protocol proxy invokes a conversion service to convert all incoming Microsoft Word files to HTML or WML, because Microsoft Word files cannot be rendered natively on most WIDs. Other similar conversions may also be automatically provided. The list of available services to be delivered to the WID along with the content may be provided in terms of the originally-accessed content, or the manipulated content, or both, as appropriate in a particular situation.

Continuing on with FIG. 3, at Block 360, the content, along with the annotated list of available services, is returned to the WID. This corresponds to message flow 7 in FIG. 1. The WID then receives this information (Block 370) and preferably displays the content and/or the available services list to the user. However, in alternative embodiments, the service list might be displayed separately from the document. A browser might import that service list and populate a dynamic menu, pop-up, service selection panel, or other custom user interface component. (As stated earlier, in some cases it may be desirable to include custom or modified client software on the WID for use with the present invention, such as software which provides a tailored user interface.)

Once the service list is available, the user may then invoke a selected service in order to initiate further manipulation of the delivered content. In response to the user's invocation, a request message will be sent to the location identified on the service invocation address (which, as illustrated herein, is preferably an address identifying a service on the DMS, but alternatively may be a service running elsewhere). This request message corresponds to message flow 8 in FIG. 1. The processing performed on the DMS in response to receiving the data manipulation request will be described with reference to the logic in FIG. 4.

In some cases, a WID may have pertinent data that is locally stored, such as information to be used when sending fax content to a recipient. After receiving a list of available services from the protocol proxy and selecting one of these services, the locally-stored data may be posted from the WID to the DMS, for use as the selected service executes.

Note that programmatic operations on the WID may invoke a data manipulation service in some cases, rather than the user performing the invocation. For example, the DMS may embed a script within the available services list, where this script may autonomously invoke a manipulation service. Suppose, for purposes of illustration, that a WID issues a request to receive a current view of the user's calendar from his desktop PC. The data returned to the WID in response to the request may include one or more software-activated alarms. When the appropriate action occurs (such as the passage of time to reach a calendared alarm event), a data manipulation service identified in a script supplied by the DMS may be programmatically triggered to perform some alarm processing (such as printing the agenda for a scheduled meeting to the printer at the designated conference room).

Turning now to FIG. 4, logic is depicted that may be used to support processing when the WID requests a data manipulation service from the DMS. At Block 400, the WID issues a request for a particular service by invoking the provided (and possibly annotated) service invocation address. (This corresponds to message flow 8 in FIG. 1.) Note that all parameters for this invocation are already available (or indirectly indicated) on the service invocation address, having been supplied by the protocol proxy during the annotation process in Block 350 of FIG. 3. At Block 410, the DMS receives the request, and at Block 420, the DMS parses the annotated information in the request to determine the specified service invocation address, the identity of the data to be manipulated, and any other parameters that may be present. At Block 430, the DMS retrieves the identified data and may optionally manipulate it, according to the requirements of the particular data manipulation service being performed. For example, the DMS may know that a conversion service is necessary before performing the manipulation operation requested by the user, and may therefore automatically invoke such processing. As described earlier, if the user requests a fax service, then the DMS may retrieve the data and convert it into a TIFF file prior to transmitting it to a fax agent, without requiring the user to explicitly request the conversion to TIFF. (The transmission to the fax agent occurs according to Block 450, described below.) The DMS may perform this processing directly, or by invoking a data output agent or other conversion software.

Preferably, the annotated service invocation address provides a complete description of the data to be manipulated, as has been shown in the examples herein. Alternatively, it may happen that the DMS needs to evaluate additional information in order to locate the data. For example, if a file name is received that does not specify a complete file path from a root directory, then the DMS preferably uses implementation-dependent techniques for resolving the location and directory path information. (Or, an error message may be returned in such cases, if desired.)

At decision Block 440, the DMS determines whether processing by a data output agent is required to complete the requested service. Each service implemented on the DMS is adapted to knowing what type of further processing is required and what agent(s) need to be invoked.

If the answer to the decision block is Yes, then control passes to Block 450 where a request to the appropriate data output agent is generated. The data output agent that is invoked is preferably determined according to the type of service to be performed, and optionally by evaluating other factors (such as the user's identity, the processing load on particular printers, current network conditions such as available bandwidth and/or outages, which data output agent supports the user's e-mail service or file system, and so forth). The data output agent performs any necessary operations, using processing which is known in the prior art, to perform the requested data manipulation. For example, if the data output agent controls an LCD projector, then the data output agent retrieves the information to be projected, renders it, and makes the rendered information available to the associated projector (e.g. through a VGA output connector). Or, if the data output agent handles sending of e-mail messages, then the message to be sent is retrieved, formatted for delivery (if necessary), and transmitted.

In alternative embodiments, the DMS may choose to not retrieve selected data content until the data is required by the data output agent. This may be implemented by generating a special URL and passing this URL to the data output agent. When the data output agent needs the content, it requests that URL (from the DMS), and then the content is actually obtained (by the DMS, possibly through the protocol proxy) and delivered to the data output agent. This has the advantage of avoiding data retrieval until/unless it is needed, and avoids the need to "push" data to the data output agent.

As indicated at Block 460, the DMS then preferably receives a response message from the invoked data output agent. This response message may be simply a success or failure indication, or it may include additional information such as status information. For example, when a print service has been invoked, the response message may indicate that the print job has started (or is queued), which printer has the print job, where that printer is located, and so forth.

When the answer to decision Block 440 is No, and also following the processing of Block 460, at Block 470 the DMS generates a response to the WID that requested the data manipulation service. Similar to the response message received at Block 460, this response message may indicate success or failure, and may include additional information about the status of the request. Optionally, the response may include a list of further data manipulation services that may be performed on the data that was sent to the WID at Block 370 of FIG. 3. In some cases, the DMS may return new content to the WID after invocation of the data manipulation service. In these cases, the response message sent in Block 470 preferably includes a newly-created list of services that are available for this new content. This processing may be performed by the DMS initiating a request to the protocol proxy for content at a URL that is actually served from the DMS, after which the protocol proxy will retrieve the content from the DMS and then query the DMS for the services list. The protocol proxy then annotates this list, and returns the content to the WID. This approach avoids duplication of the service annotation processing logic.

Figure 6A:
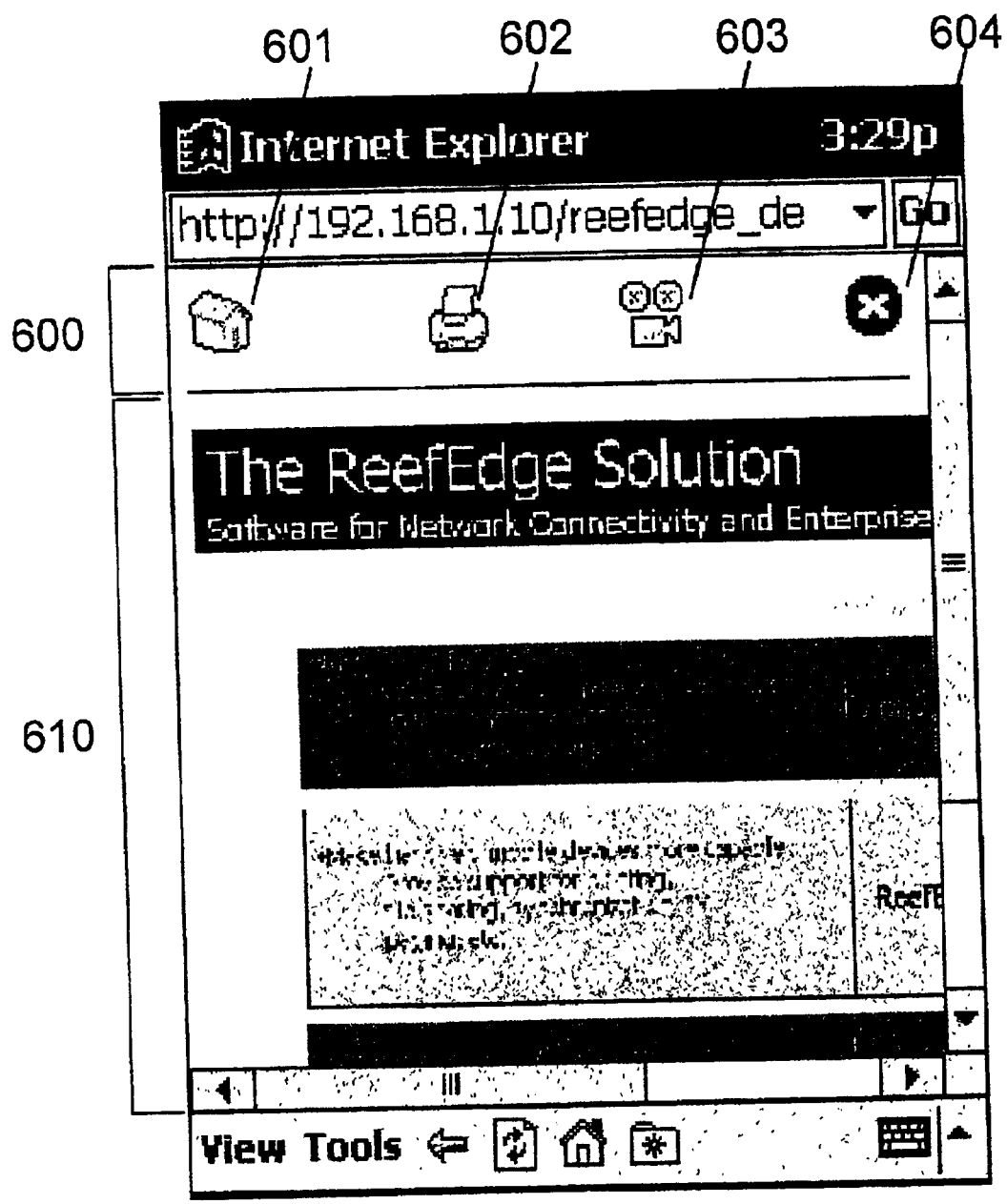
FIGS. 6A and 6B illustrate samples of graphical user interface ("GUI") displays that may be used to display available service information, according to the present invention.

Turning now to FIG. 6A, a sample GUI display that provides available service information is illustrated, according to the present invention. This display shows an image of a Microsoft PowerPoint presentation file that has been retrieved by a file access proxy. The file has also been converted for display on the WID (e.g. to make the slides of the presentation viewable on the WID's display panel). This conversion may be performed automatically by the protocol proxy upon detecting that the requested content is a PowerPoint file and/or that the target WID cannot display files of this type, as discussed earlier. Along with the content 610 of the slide, four icons 601–604 have been provided in a header area 600 to enable the user to select from among four data manipulation services which are available for this content. The first icon 601 provides a link to a home page; icon 602 may be selected to print the content; icon 603 may be selected to project the content; and icon 604 may be selected to log out of the system.

Figure 6B:
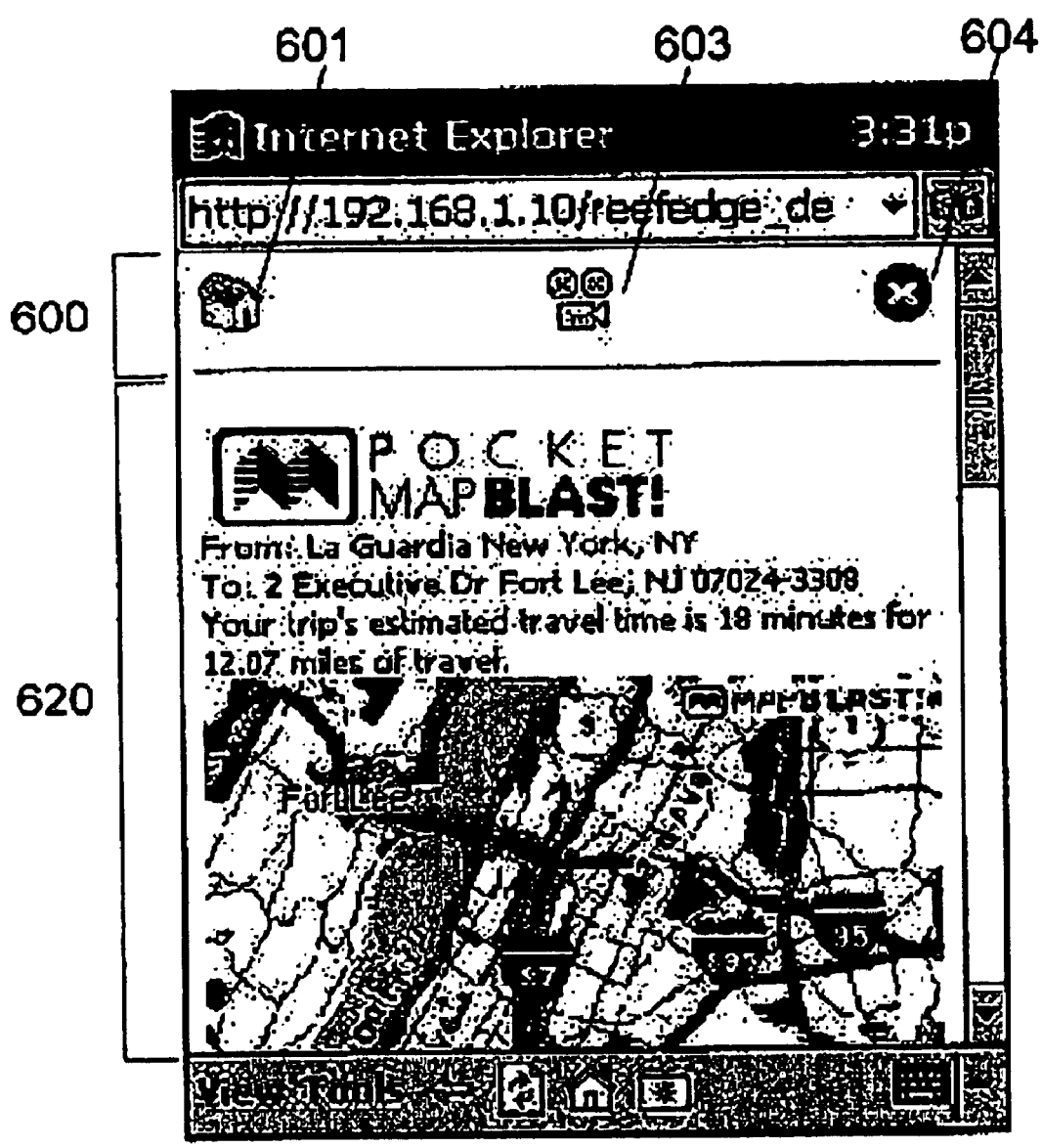

FIG. 6B provides another sample GUI display with available service information. This display shows an image 620 of a page retrieved from a Web server. Along with this content 620, three icons 601, 602, and 604 have been provided in header area 600. These icons represent the same functions discussed with reference to FIG. 6A. In this example, the printer icon 603 has been omitted, and the user therefore cannot request printing of the image. (It may be that there is no printer available for the WID's current location, or that the user is not authorized to access the printer, etc.)

As has been demonstrated, the present invention provides a number of advantages over prior art solutions for accessing and manipulating data content from a WID. The teachings which have been described do not require modifications of the WID, yet support a wide variety of data manipulation operations and a wide variety of content types. Furthermore, the supported operations and content types are easily extensible, again without requiring modifications to the WID.

The foregoing description of a preferred embodiment is for purposes of illustrating the present invention, and is not to be construed as limiting thereof. Although a preferred embodiment has been described, it will be obvious to those of skill in the art that many modifications to this preferred embodiment are possible without materially deviating from the novel teachings and advantages of this invention as disclosed herein. Accordingly, all such modifications are intended to be within the scope of the present invention, which is limited only by the claims hereafter presented (and their equivalents).

That which is claimed is:

1. A method of enabling data access and manipulation from a pervasive device, comprising steps of:
   receiving a data access request from a pervasive device;
   obtaining the requested data;
   determining what data manipulation operations are available for the obtained data, as well as a location of each available data manipulation operation; and
   returning the determined data manipulation operations and locations to the pervasive device, in addition to the obtained data.

2. The method according to claim 1, further comprising steps of:
   requesting operation of a selected one of the determined data manipulation operations; and
   performing the requested operation, wherein the performing step is executed by another device on behalf of the pervasive device.

3. The method according to claim 2, wherein the requested operation is a file storage operation.

4. The method according to claim 2, wherein the requested operation is a print operation.

5. The method according to claim 2, wherein the requested operation is one of a fax operation, an e-mail operation, a project operation, or a voice mail application.

6. The method according to claim 2, further comprising the step of annotating selected ones of the locations of the determined data manipulation operations with an identifier of respective ones of the obtained data.

7. The method according to claim 2, further comprising the step of annotating selected ones of the returned data manipulation operations and locations with one or more cookies which were present on the received data access request.

8. The method according to claim 2, further comprising the step of annotating selected ones of the returned data manipulation operations and locations with one or more parameters for use by the performing step.

9. The method according to claim 8, wherein a selected set of the parameters which are returned to the pervasive device are provided in the requesting step and are then used by the performing step.

10. The method according to claim 8, wherein the annotating step is performed by a protocol proxy component which receives the data access request in the receiving step, and wherein the annotating step is performed prior to operation of the returning step.

11. The method according to claim 10, wherein the determining and returning steps are performed by the protocol proxy.

12. The method according to claim 10, wherein the protocol proxy receives requests and transmits responses using Hypertext Transfer Protocol ("HTTP") messages.

13. The method according to claim 10, wherein the protocol proxy receives requests and transmits responses using Wireless Session Protocol ("WSP") messages.

14. The method according to claim 10, wherein the protocol proxy receives requests and transmits responses using Simple Mail Transfer Protocol ("SMTP"), Post Office Protocol ("POP" or "POP3"), or Internet Message Access Protocol ("IMAP") messages.

15. The method according to claim 10, wherein the protocol proxy receives requests and transmits responses using a synchronization protocol.

16. The method according to claim 10, wherein the protocol proxy is configured to accept requests from the pervasive device.

17. The method according to claim 10, wherein the protocol proxy and the pervasive device communicate through a wireless access point.

18. The method according to claim 2, wherein:
the locations comprise address information for each determined data manipulation operation;
the requesting operation step further comprises issuing a request using the address information of the selected data manipulation operation; and
the performing step further comprises executing a service which is located using the address information of the issued request.

19. The method according to claim 2, wherein the requesting step is performed by a user of the pervasive device.

20. The method according to claim 2, wherein the requesting step is performed programmatically without intervention of a user of the pervasive device.

21. The method according to claim 2, further comprising the step of programmatically requesting, by a protocol proxy, a selected data manipulation operation on the obtained data, and wherein the returning step returns a result of the selected data manipulation operation as the obtained data.

22. The method according to claim 2, further comprising the step of dispatching the requested operation, by a manager which receives the operation request, to the other device prior to operation of the performing step.

23. The method according to claim 22, further comprising the step of passing information to the manager along with the operation request, wherein the passed information enables the manager to ensure that the performing step operates on data which is identical to the returned data.

24. The method according to claim 23, wherein the passed information comprises one or more cookies which are present in a header of the data access request.

25. The method according to claim 1, wherein the determining step further comprises determining what data manipulation operations are available for a content type of the obtained data.

26. The method according to claim 25, wherein the determining step further comprises determining what data manipulation operations are available for a user of the pervasive device.

27. The method according to claim 25, wherein the determining step further comprises determining what data manipulation operations are available for a current location of the pervasive device.

28. The method according to claim 1, wherein the determining step further comprises determining what data manipulation operations are available for a user of the pervasive device.

29. The method according to claim 28, wherein the step of determining what data manipulation operations are available for the user of the pervasive device further comprises obtaining information about the user from a protocol header of the data access request.

30. The method according to claim 28, wherein the step of determining what data manipulation operations are available for the user of the pervasive device further comprises obtaining information about access privileges of the user.

31. The method according to claim 30, wherein the information about access privileges of the user is obtained from a repository which stores access privilege information.

32. The method according to claim 1, wherein the determining step further comprises determining what data manipulation operations are available for a user group of which a user of the pervasive device is a member.

33. The method according to claim 1, wherein the determining step further comprises determining what data manipulation operations are available for a current location of the pervasive device.

34. The method according to claim 33, wherein the step of determining what data manipulation operations are available for the current location of the pervasive device further comprises accessing a global positioning system ("GPS") function of the pervasive device or a location registry associating the pervasive device with a plurality of access points.

35. The method according to claim 1, wherein the determining step further comprises determining what data manipulation operations are available for the pervasive device.

36. The method according to claim 35, wherein information used in the step of determining what data manipulation operations are available for the pervasive device is obtained from a protocol header which specifies types of content accepted by the pervasive device.

37. The method according to claim 35, wherein information used in the step of determining what data manipulation operations are available for the pervasive device is obtained from a protocol header which specifies browser capabilities of a browser operating on the pervasive device.

38. The method according to claim 35, wherein information used in the step of determining what data manipulation operations are available for the pervasive device is obtained by analyzing capability information provided by the pervasive device.

39. The method according to claim 35, wherein information used in the step of determining what data manipulation operations are available for the pervasive device is obtained from a repository which specifies capabilities of the pervasive device.

40. The method according to claim 1, wherein the returning step further comprises returning at least one graphical symbol or icon for particular ones of the returned data manipulation operations and locations.

41. The method according to claim 1, wherein the determining step further comprises accessing a data structure to locate information used by the returning step, wherein the data structure stores information about the data manipulation operations that are available for the obtained data and the location of each available data manipulation operation.

42. The method according to claim 41, wherein new data manipulation operations are supported for use in the determining step by adding information about the new data manipulation operations and the location of each new data manipulation operation to the data structure.

43. The method according to claim 1, wherein the determining step further comprises:
accessing a data structure to locate information used by the returning step, wherein the data structure stores information about the data manipulation operations that are available for the obtained data; and
dynamically determining the location of each available data manipulation operation.

44. The method according to claim 43, wherein the dynamically determining step further comprises evaluating at least one of current processor load and current network conditions.

45. The method according to claim 1, further comprising the step of automatically invoking one or more of the determined data manipulation operations.

46. The method according to claim 45, wherein the automatically invoking step operates before the returning step.

47. The method according to claim 1, further comprising the steps of:
determining one or more selected data manipulation operations that should be performed automatically on the obtained data;
performing the selected data manipulation operations on the obtained data, thereby creating transformed data; and
using the transformed data as the obtained data for the step of determining what data manipulation operations are available.

48. The method according to claim 1, wherein operation of the steps requires no additional software on the pervasive device.

49. The method according to claim 1, wherein operation of the steps requires no additional hardware on the pervasive device.

50. A system for enabling data access and manipulation from a pervasive device, comprising:

means for receiving a data access request from a pervasive device;
means for obtaining the requested data;
means for determining what data manipulation operations are available for the obtained data, as well as a location of each available data manipulation operation; and
means for returning the determined data manipulation operations and locations to the pervasive device, in addition to the obtained data.

51. The system according to claim 50, further comprising:
means for requesting operation of a selected one of the determined data manipulation operations; and
means for performing the requested operation, wherein the means for performing is executed by another device on behalf of the pervasive device.

52. Computer program instructions for enabling data access and manipulation from a pervasive device, the computer program instructions embodied on one or more computer readable media and comprising:
computer program instructions for receiving a data access request from a pervasive device;
computer program instructions for obtaining the requested data;
computer program instructions for determining what data manipulation operations are available for the obtained data, as well as a location of each available data manipulation operation; and
computer program instructions for returning the determined data manipulation operations and locations to the pervasive device, in addition to the obtained data.

53. The computer program instructions according to claim 52, further comprising:
computer program instructions for requesting operation of a selected one of the determined data manipulation operations; and
computer program instructions for performing the requested operation, wherein the means for performing is executed by another device on behalf of the pervasive device.

54. A method of enabling a pervasive device to access and manipulate remotely-stored data, comprising steps of:
receiving a data access request from the pervasive device;
obtaining the requested data;
determining what data manipulation operations are available for the obtained data, as well as a location of each available data manipulation operation; and
returning the determined data manipulation operations and locations to the pervasive device, in addition to the obtained data.

55. A method of accessing and manipulating remotely-stored data from a pervasive device, comprising steps of:
requesting an access of the remotely-stored data from the pervasive device; and
receiving the requested data at the pervasive device, along with information about one or more data manipulation operations that have been determined to be available for the obtained data.

56. The method according to claim 55, wherein the information further comprises a location of each available data manipulation operation.

57. The method according to claim 56, further comprising the step of requesting operation of a selected one of the data manipulation operations.

* * * * *